US009980588B2

(12) United States Patent
Benati

(10) Patent No.: US 9,980,588 B2
(45) Date of Patent: May 29, 2018

(54) WINE DECANTER DEVICE

(76) Inventor: Carlo Benati, Nogarole Rocca VR (IT)

(*) Notice: Subject to any disclaimer, the term of this patent is extended or adjusted under 35 U.S.C. 154(b) by 881 days.

(21) Appl. No.: 14/237,148

(22) PCT Filed: Jul. 31, 2012

(86) PCT No.: PCT/EP2012/064978
§ 371 (c)(1), (2), (4) Date: Feb. 4, 2014

(87) PCT Pub. No.: WO2013/017604
PCT Pub. Date: Feb. 7, 2013

(65) Prior Publication Data
US 2014/0150668 A1 Jun. 5, 2014

(30) Foreign Application Priority Data
Aug. 4, 2011 (IT) ................................ PI2011U0016

(51) Int. Cl.
*C12G 3/06* (2006.01)
*C12H 1/22* (2006.01)
*A47G 23/02* (2006.01)
*A47G 23/00* (2006.01)
*B01F 3/04* (2006.01)

(52) U.S. Cl.
CPC ......... *A47G 23/0241* (2013.01); *A47G 23/00* (2013.01); *B01F 3/0446* (2013.01); *B01F 3/04744* (2013.01); *B01F 2215/0072* (2013.01)

(58) Field of Classification Search
CPC ................ A47G 23/00; A47G 23/0241; A47G 2400/04; A47G 2400/045; B01F 3/04; B01F 3/04099; B01F 3/0446; B01F 3/04496; B01F 3/04744; B01F 3/04754; B01F 2215/0072
See application file for complete search history.

(56) References Cited

U.S. PATENT DOCUMENTS

| | | | | |
|---|---|---|---|---|
| 2,583,206 | A | 1/1952 | Borck et al. | |
| 5,293,912 | A | 3/1994 | Wildash et al. | |
| 5,713,263 | A | 2/1998 | Burks, III | |
| 7,975,872 | B2 * | 7/2011 | Lardino | A47G 19/2205 220/703 |
| 2005/0205609 | A1 | 9/2005 | Moore | |
| 2007/0023590 | A1 * | 2/2007 | Lotz | F16M 7/00 248/188.2 |

(Continued)

OTHER PUBLICATIONS

How To Prepare A Lucid Absinthe Drip Cocktail, https://www.youtube.com/watch?v=77oBap9VC2U, Published Sep. 17, 2009.*

*Primary Examiner* — Dana Ross
*Assistant Examiner* — Brandon Harvey
(74) *Attorney, Agent, or Firm* — Ference & Associates LLC

(57) ABSTRACT

A device is set out which considerably increase the exchange surface for aerating or oxygenating wine compared to prior art devices or decanters. In the invention, a series of components are mounted on top of each other, whereby wine poured from a bottle flows in sequential order, by force of gravity, through these components until it flows into glasses to be served to consumers. The structure of these components is such that each component enhances exposure to air and maximum oxygenation of the wine flowing through it.

9 Claims, 2 Drawing Sheets

(56) References Cited

U.S. PATENT DOCUMENTS

| | | | | |
|---|---|---|---|---|
| 2007/0256568 | A1 | 11/2007 | Nudi | |
| 2011/0024925 | A1 * | 2/2011 | Mauffette | A47G 23/00 261/76 |
| 2011/0154994 | A1 * | 6/2011 | Sabadicci | A47G 23/00 99/323.1 |
| 2011/0297001 | A1 * | 12/2011 | DeJohn | B01F 3/04744 99/277.2 |
| 2014/0130681 | A1 * | 5/2014 | Castanon Delgado | C12G 1/00 99/323.1 |

* cited by examiner

WINE DECANTER DEVICE

The present application relates to a device for aerating or oxygenating wine.

Decanting wine is an operation that is carried out for leaving sediments inside of a just opened wine bottle, as well as for oxygenating or aerating the wine before drinking.

It is known that wine to be oxygenated is poured into a suitably devised instrument—known as "decanter"—consisting of a receptacle with very large base and rather reduced height, and having a pouring neck.

In this way the exchange surface between the air and the wine layer inside the decanter is larger than the corresponding exchange surface inside a wine bottle.

However, it must be noted that the use of decanters is not completely free from drawbacks.

The most critical aspect of this technology is related with the rather long time that is necessary to obtain effective aeration or oxygenation of the wine poured inside a decanter.

Actually, wine needs to "rest" for several minutes—sometimes hours—inside the decanter before being properly aerated or oxygenated.

The purpose of the present invention is that to obtain a perfect aeration or oxygenation of the wine in a very short time, practically instantaneously.

In particular, the invention aims to provide a device able to considerably increase the exchange surface for aerating or oxygenating wine compared to the one provided by an ordinary decanter.

According to an aspect, the device according to the invention comprises a series of components mounted on top of each other, whereby the wine poured from a bottle flows in sequential order, by force of gravity, through these components until it flows into glasses to be served to consumers.

The structure of said components is such that each component enhances exposure to air and maximum oxygenation of the wine flowing through it.

The main component of the device according to an aspect of the invention is constituted by a funnel-shaped container adapted to contain a plurality of small freely-movable spheres, the end of said container being a pipe with vertical axis.

When a bottle of wine is poured inside said container, the wine flow is "broken up" by the spheres and is continuously deviated, thereby allowing the wine being poured to be in contact with air.

As a consequence, the desired aeration or oxygenation process much more rapidly than in a traditional decanter.

Moreover, according to an aspect of the invention, the end pipe of said funnel-shaped container leads the wine poured inside it into a cup that is placed beneath said container, thereby enhancing a further aeration or oxygenation of the wine poured into said cup owing to the shape of the cup.

According to another aspect of the invention, the cup is provided, under its bottom wall, with four radial wine distribution pipes through which the wine flows towards an additional component of the device according to the invention.

This additional component practically consists in a pyramid-shaped dispenser having a supporting said cup on its vertex.

The four inclined edges of said dispenser are configured as U-shaped conduits or grooves.

Moreover, said radial wine distribution pipes of said cup match with said U-shaped conduits of said dispenser, whereby the wine flowing inside the U-shaped conduits is poured inside corresponding glasses placed beneath the terminal end of said conduits.

It is important to mention that the wine streaming downwardly within the U-shaped conduits is also exposed to air in a dynamic condition enhancing additional aeration or oxygenation.

Advantageously, the components of the device according to the present invention are supported by a height-adjustable base keeping in a horizontal position all the components of the device, as well as the glasses.

Figure 1:
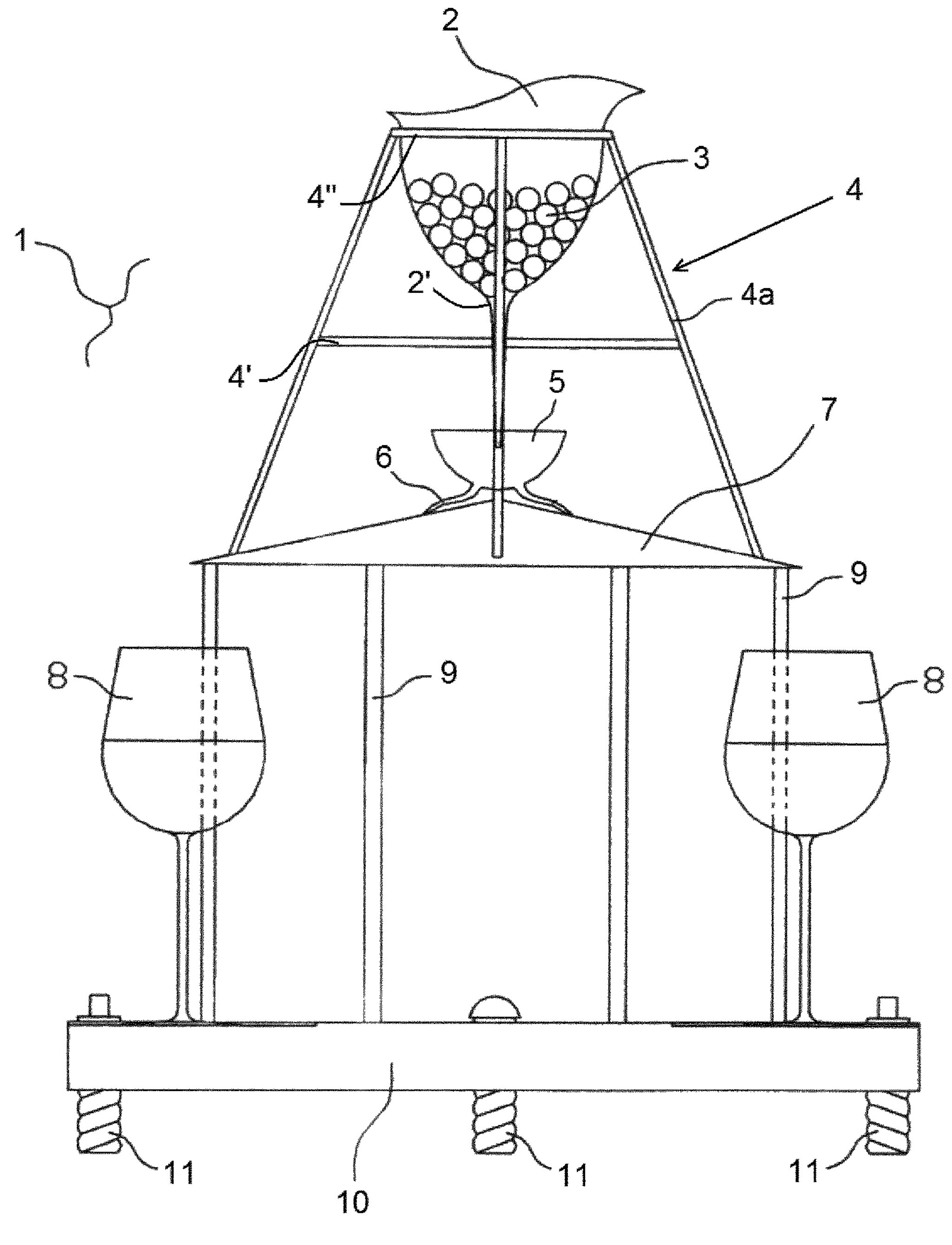
FIG. 1 is a side view of a device according to the present invention.
Figure 4:
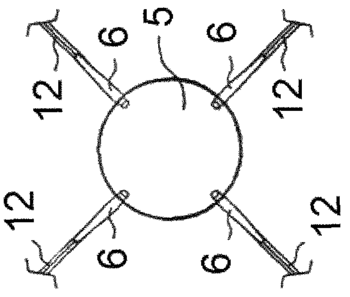
FIG. 4 is a top view of a cup having four radially placed end pipes belonging to a device according to the present invention.
Figure 5:
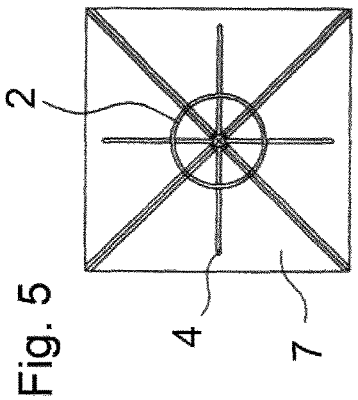
FIG. 5 is a top view of a structure supporting a funnel-shaped container of a device according to the present invention.

In the drawings, a device (1) is provided with a stabilization base (10) having a substantially square shape, suitable for being placed on a table or any other horizontal surface.

Said base (10) is provided with four height-adjustable feet, essentially consisting in four screws with vertical axis (11) engaged into threaded holes crossing the entire thickness of the base (10).

By setting said screws (11) a user may place said base (10), and thereby the whole device (1) in a horizontal position.

In fact, a perfectly horizontal position of said base (10) is the necessary condition to obtain a uniform filling of glasses (8) positioned at the four corners of the base (10).

Figure 2:
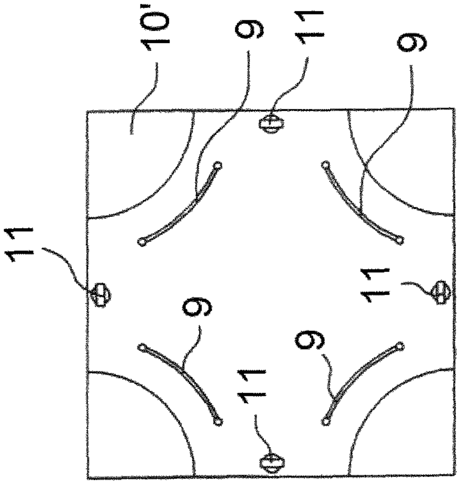
FIG. 2 is a top view of a height-adjustable base of a device according to the present invention.

Referring to FIGS. 1 and 2, four slightly curved vertical supports (9) protrude from the upper surface of the base (10), the edges of which are directed towards the four corners of the base, said supports (9) being suitable for supporting a pyramid-shaped dispenser (7) having a square base.

Figure 3:
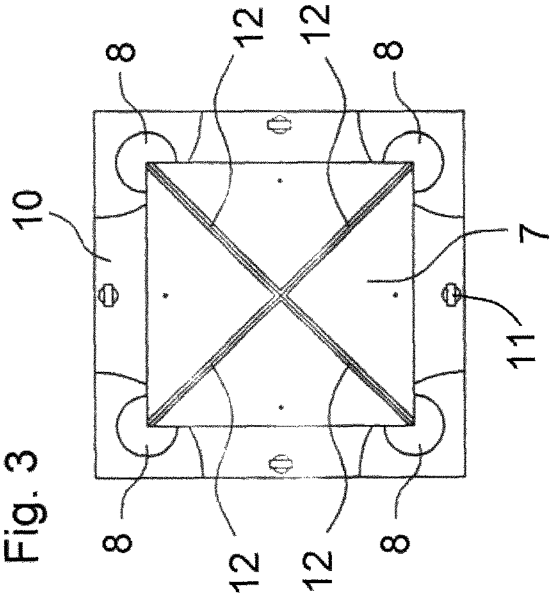
FIG. 3 is a top view of a pyramid-shaped dispenser of device according to the present.

As shown in FIG. 3, said dispenser (7) has a considerably smaller surface than the base (10), and it is placed centrally on said base (10).

FIG. 3 also shows four inclined conduits (12), which are respectively placed in correspondence of the four inclined edges of the pyramidal structure.

Accordingly, the conduits (12) substantially end at the four corners of the base (10) in correspondence of areas (10') acting as support surface for supporting four respective glasses (8) on the base (10).

As shown in FIG. 1, the height of said vertical supports (9) interposed between base (10) and dispenser (7) is slightly higher than the height of a typical wine goblet.

Hence, each glass (8) is placed under the lower end of a corresponding inclined conduit (12) of said dispenser (7).

Referring to FIG. 2, said curved supports (9) are disposed on the base (10) in more internal position with respect to said areas (10') for supporting the glasses (8).

Such a position of said supports (9), with their concave profile facing the angular areas (10') of the base (10), guarantees that their presence does not hinder the positioning of glasses (8) in correspondence of the areas (10').

A cup (5) is placed above said pyramidal dispenser (7), said cup being provided, in correspondence of its bottom wall, with four radial wine distribution pipes (6), each of them being spaced from an adjacent one by an angle of 90°.

Such cup (5) is mounted on the vertex of the pyramidal dispenser (7), in such manner that said pipes (6) are exactly aligned with said inclined conduits (12) provided in said dispenser (7).

FIG. 1 clearly shows the position and configuration of said cup (5), as well as the special tapered downward profile given to the free end of each of said pipes (6).

Because of this special configuration, the free ends of the four pipes (6) act as supporting points for the cup (5), as they are inserted in the corresponding inclined conduits (12) of the dispenser (7).

A vertical, frustoconical-shaped, cage structure (4), preferably made of metal sections, is fixed above said dispenser (7.

It comprises four upward-converging rods (4*a*) connected by two metal rings (4', 4") placed on respective horizontal planes, the first one (4') having a larger diameter being positioned approximately at a half of the height of the rods (4*a*) and the second one (4") having a considerably smaller diameter being positioned in correspondence of the top of said vertical structure (4), thereby forming an upper opening.

More precisely, the lower end of each rod (4*a*) is fixed centrally at the lower side of one of the triangular sloping walls of said pyramidal dispenser (7).

This frusto-conical vertical structure (4) supports a funnel-shaped container (2) in correspondence of said upper opening.

Moreover, considering that the vertical structure (4) is centered with respect to the pyramidal dispenser (7), it may easily be understood that the funnel-shaped container (2) supported by said structure (4) is vertically aligned to the vertex of said dispenser (7) and is also vertically aligned to said cup (5).

In particular, the funnel-shaped container (2) is inserted downwards inside the upper opening of the frusto-conical vertical structure (4), in such manner to rest on said second ring (4"), whose diameter is smaller than the container's upper diameter.

As shown in FIG. 1, the funnel-shaped container (2) comprises a vertical pipe (2') connected to the tapered bottom wall of said container, the lower end of said pipe (2') being placed inside said cup (5).

Said funnel-shaped container (2) contains a plurality of small glass spheres (3).

The device according to the invention is operated in the following way.

The contents of a wine bottle is poured inside said funnel-shaped container (2).

Owing to the force of gravity, the wine naturally flows downward to the bottom of the container (2).

On the downward path, the wine flow is continuously deviated by the surface of said spheres (3).

In other words, the presence of the spheres (3) creates a considerable turbulence in said vertical wine flow, thereby suddenly increasing the oxygen exchange surface.

Once the wine reaches the bottom of the funnel-shaped container (2), it flows into said vertical pipe (2').

In this way, the wine is poured inside said cup (5) whose relatively large surface additionally enhances oxygenation of the wine that remains therein for a short time, said cup practically acting as a traditional decanter.

After reaching the bottom of the cup (5), the wine is directed outwards, by force of gravity, through said radial pipes (6).

Said radial pipes (6) generate four thin wine flows streaming inside the inclined conduits (12) of the pyramidal dispenser (7).

Since the inclined conduits (12) are open on the top, the wine flowing inside them undergoes an additional "dynamic" air exposure, which enhances a further oxygenation.

Finally, the wine flowing in the inclined conduits (12 is poured inside the four glasses (8) placed on the base (10) just beneath the lower ends of said conduits (12).

The wine, which has sufficiently been oxygenated on its vertical turbulent path, is then ready for being consumed.

It is clear that should a user not intend to fill all the four glasses (8)—but only a lower number of them—the user will simply close one of the pipes (6) of the cup (5), thus preventing wine from flowing towards said inclined conduits (12) of the dispenser (7).

According to another form of embodiment of the invention, the device (1) can also be adapted to simultaneously fill a number of glasses (8) higher than four.

In this case, said cup (5) is provided with a number of radial distribution pipes (6) higher than four.

Consequently, said pyramid-shaped dispenser (7) has a different polygonal base (instead of a square one) so as to be provided with a number of inclined conduits (12) equal to the number of pipes (6) of the cup (5).

Finally, the base (10) is in this case provided with a number of glass supporting areas (10') equal to the number of inclined conduits (12) provided in the dispenser (7).

The invention claimed is:

1. A wine aerating or oxygenating device, comprising:
- a funnel-shaped container whose bottom is provided with a vertical pipe;
- a cup, positioned beneath said vertical pipe, for receiving a flow of wine that is poured inside said funnel-shaped container, wherein said funnel-shaped container is at least partially filled with a plurality of spheres for breaking up and diverting said flow of wine streaming from the top to the bottom of said funnel-shaped container;
- a dispenser supporting said cup, wherein the dispenser has a pyramidal shape having a series of inclined walls and multiple inclined conduits being placed along edges of the pyramid inclined walls.

2. The device of claim 1, wherein a bottom of said cup is provided with multiple radial distribution pipes having terminal ends.

3. The device of claim 2, wherein the terminal ends of said multiple radial distribution pipes of said cup are inserted into said multiple inclined conduits of the dispenser.

4. The device of claim 3, including a base provided with structure for supporting vertically said dispenser of said base.

5. The device of claim 4, wherein said structure for supporting vertically said dispenser on said base comprise a series of vertical supports mounted by one end on the base and connected by the other end to said dispenser in order to keep the dispenser at a predetermined distance from the base.

6. The device of claim 1, comprising a structure for keeping the pipe of said funnel-shaped container vertically aligned to a center of said cup.

7. The device of claim 1, comprising a structure for keeping the pipe of said funnel shaped vertically aligned to the center of said cup, whereby said cup is mounted on a vertex of said pyramid-shaped dispenser and whereby a base of said structure is mounted on said dispenser.

8. The device of claim 4, wherein said base comprises multiple areas for positioning multiple glasses, each area being positioned beneath a terminal end of each inclined conduit of said dispenser.

9. The device of claim 4, further comprising structure capable of horizontally securing said base.

* * * * *